No. 651,934. Patented June 19, 1900.
A. C. SAXTON.
ADJUSTER FOR SAW FILING AND SETTING MACHINES.
(Application filed Oct. 31, 1899.)
(No Model.)
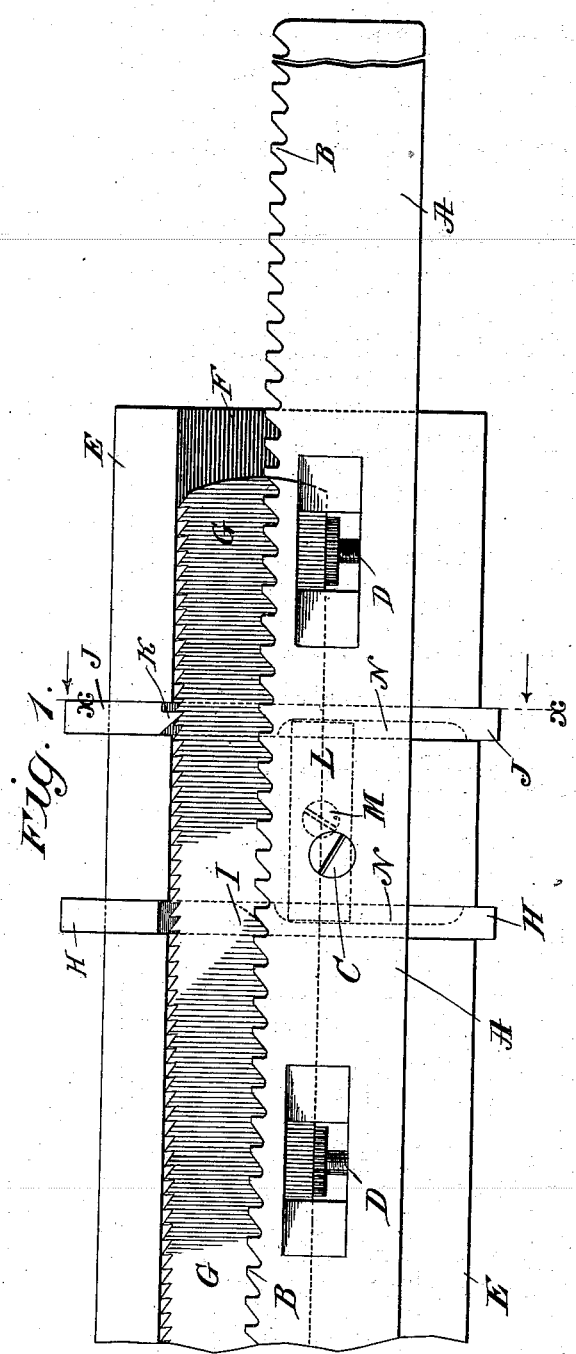
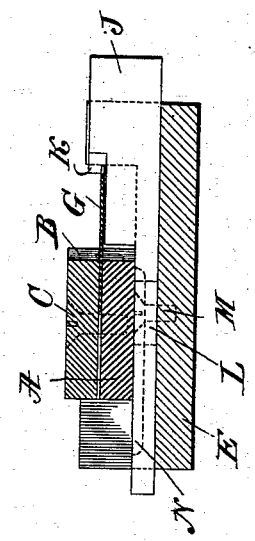
Witnesses
Edward T. Rowland.
Edgar R. Mead.
Inventor
Augustus C. Saxton
By his Attorney
Phillips Abbott
THE NORRIS PETERS CO., PHOTO-LITHO., WASHINGTON, D. C.

UNITED STATES PATENT OFFICE.

AUGUSTUS C. SAXTON, OF NEW YORK, N. Y.

ADJUSTER FOR SAW FILING OR SETTING MACHINES.

SPECIFICATION forming part of Letters Patent No. 651,934, dated June 19, 1900.

Application filed October 31, 1899. Serial No. 735,352. (No model.)

*To all whom it may concern:*

Be it known that I, AUGUSTUS C. SAXTON, a citizen of the United States, residing at No. 371 Pearl street, in the borough of Brooklyn, city of New York, State of New York, have invented what I call a "saw-adjuster" to be used in conjunction with saw-filing or saw filing and setting machines in which the saw when being operated upon by the machine is held in a carriage, which is fed forward by the action of the machine by a step-by-step movement, and to which carriage the saw should bear a certain definite relation in order that the teeth thereof may properly register with the filing and setting devices, of which the following is specification.

In the drawings hereof, Figure 1 illustrates a plan view of the invention. Fig. 2 illustrates a transverse vertical section on the line $x\,x$ of Fig. 1 looking in the direction of the arrow.

A represents the saw carriage or frame. It is composed of two parts and is provided with the usual rack B or set of feeding-teeth, with which the feeding-pawl of the machine engages. The two parts are clamped together, thus holding the saw firmly between them, by screws C, and the saw is adjusted laterally by means of set-screws D, upon the heads of which the saw rests edgewise. All these parts are well known and do not require further description here.

My invention resides in the gage or adjusting device shown in the drawings, which is constructed and used as follows:

E is a flat bar or frame, of metal, of such width and thickness as desired. It has a wide flat-bottomed channel F (see Fig. 1) cut in one face of it deep enough to receive the carriage flatwise and wide enough to hold the carriage and the saw G when it has the desired lateral projection from the carriage.

H is a bar of metal adapted to slide crosswise of the gage E in a suitable channel cut therein for it, and this bar is provided with a tooth I, which is adapted to engage with the rack-teeth B of the carriage. J is another transverse bar likewise adapted to move through a channel cut in the gage E, and it has a tooth K, adapted to engage with the teeth of the saw, as shown. These two sliding bars are held in place by means of a strap L, set in a recess in the bottom of the gage and held by a screw M. The ends of the strap are entered into keyways N, cut in the respective cross-bars, as shown. These two bars H and J bear such a relation to each other that when the tooth of one engages fully with the teeth of the feeding-rack of the carriage and the tooth of the other with the teeth of the saw then the proper relation of the saw to the carriage will be assured, whereby the action of the filing and setting devices may be best performed.

The operation is simple. The frame, with the saw in it, but not in any manner clamped, is put in the gage, as shown. The back edge of the carriage is then pressed snugly against the back edge of the recess F of the gage. The cross-bar H is then pressed inwardly and the carriage moved slightly to the right or left, as occasion may require, so that the tooth I on H will fully engage with the rack-teeth on one or the other side of the carriage. There is preferably sufficient friction between the slideway for the bar H and itself to insure its holding the carriage in proper position when the stated adjustment has been made. Then the set-screws D are turned in such manner as to move the saw laterally relative to the carriage until the teeth of the saw engage with the opposite wall of the recess in the gage, and thus the proper lateral projection of the saw is secured, and during this movement of the saw it is moved to the right or left, as required, so that the tooth K of the bar J will properly engage with one of the teeth of the saw. When these adjustments have all been made, the screws C are set up, whereupon the saw will be rigidly clamped in the carriage in such manner that they together may be put into the machine with positive assurance that all adjustments are correct.

It will be obvious to those who are familiar with this art that certain modifications may be made in the details of construction shown and described by me and yet the essentials be employed. I therefore do not limit myself to the said details.

I claim—

1. An adjuster for saw filing or setting machines embodying a frame adapted to receive the saw-blade and its carriage and devices whereby the saw may be adjusted relative to its carriage so as to register with the operative devices on said machine for the purposes set forth.

2. An adjuster for saw filing or setting machines embodying a frame having a recess the width of which is adapted to determine the projection of the saw-blade beyond the carriage and means to determine the longitudinal position of the saw-blade relative to the carriage for the purposes set forth.

3. An adjuster for saw filing or setting machines embodying a frame having a recess the width of which is adapted to determine the lateral projection of the saw-blade beyond the carriage and adjustable devices on the frame adapted to engage with and to determine the relative positions of the saw and its carriage for the purposes set forth.

4. An adjuster for saw filing or setting machines embodying a frame adapted to receive the saw-blade and its carriage and adjustable devices on the frame adapted to engage with and to determine the relative positions of the saw-blade and its carriage for the purposes set forth.

AUGUSTUS C. SAXTON.

Witnesses:
PHILLIPS ABBOTT,
D. SOLIS RITTERBAND.